(12) United States Patent
Clark

(10) Patent No.: US 8,383,213 B1
(45) Date of Patent: Feb. 26, 2013

(54) DECORATION DEVICE FOR WINDSHIELD WIPERS

(76) Inventor: Donald Clark, Evergreen Park, IL (US)

( * ) Notice: Subject to any disclaimer, the term of this patent is extended or adjusted under 35 U.S.C. 154(b) by 419 days.

(21) Appl. No.: 12/651,261

(22) Filed: Dec. 31, 2009

(51) Int. Cl.
  *B60R 13/04* (2006.01)
  *B60J 1/00* (2006.01)
  *B60S 1/04* (2006.01)

(52) U.S. Cl. ................................. 428/31; 15/250.001

(58) Field of Classification Search ........... 15/250.001–250.48; 428/31
  See application file for complete search history.

(56) References Cited

U.S. PATENT DOCUMENTS

| | | | |
|---|---|---|---|
| 3,873,086 A * | 3/1975 | Lee | 472/57 |
| D411,161 S | 6/1999 | Wooten | |
| 5,933,991 A * | 8/1999 | Gaul | 40/591 |
| 6,070,287 A | 6/2000 | Kornegay | |
| 6,195,832 B1 * | 3/2001 | Shuen | 15/250.201 |
| 6,247,201 B1 | 6/2001 | McCray | |
| 6,327,738 B1 | 12/2001 | Lewis | |
| 6,338,177 B1 * | 1/2002 | Lee | 15/250.201 |
| 6,582,314 B1 * | 6/2003 | Arehart | 472/51 |
| 6,922,929 B1 * | 8/2005 | Schramek | 40/591 |
| 7,222,385 B1 * | 5/2007 | Borg | 15/250.3 |
| D577,324 S | 9/2008 | McCray | |
| D578,735 S * | 10/2008 | Jacobs | D2/741 |
| D586,716 S | 2/2009 | Radfar | |
| 2004/0060143 A1 * | 4/2004 | Shuen | 15/250.201 |
| 2005/0235448 A1 | 10/2005 | Richard | |

* cited by examiner

*Primary Examiner* — D. Lawrence Tarazano
*Assistant Examiner* — Stephanie Cox

(57) ABSTRACT

A decoration device for attaching to a windshield wiper featuring a generally flexible elongated strip; a cloth component disposed on a top surface of the strip, the cloth component resembles a tail of an animal, the animal includes a cat, a dog, a lion, a rhinoceros, a snake, a tiger, an elephant, a zebra, a wolf, a dingo, a kangaroo, or the like; and at least one clip disposed on a bottom surface of the strip, the clip is configured to wrap around a portion of the arm of the windshield wiper, the clip comprises a screw clamp for tightening the clip around the portion of the arm of the windshield wiper.

3 Claims, 3 Drawing Sheets

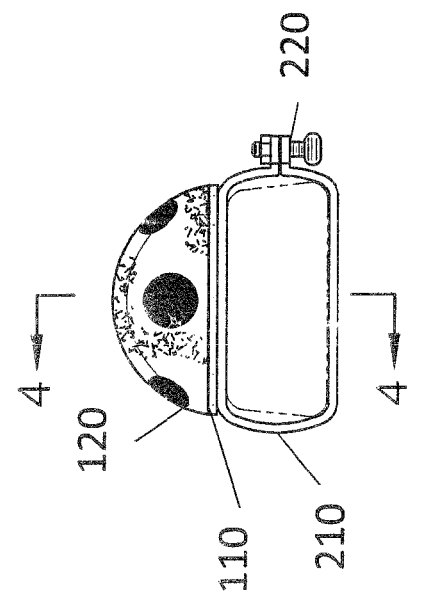
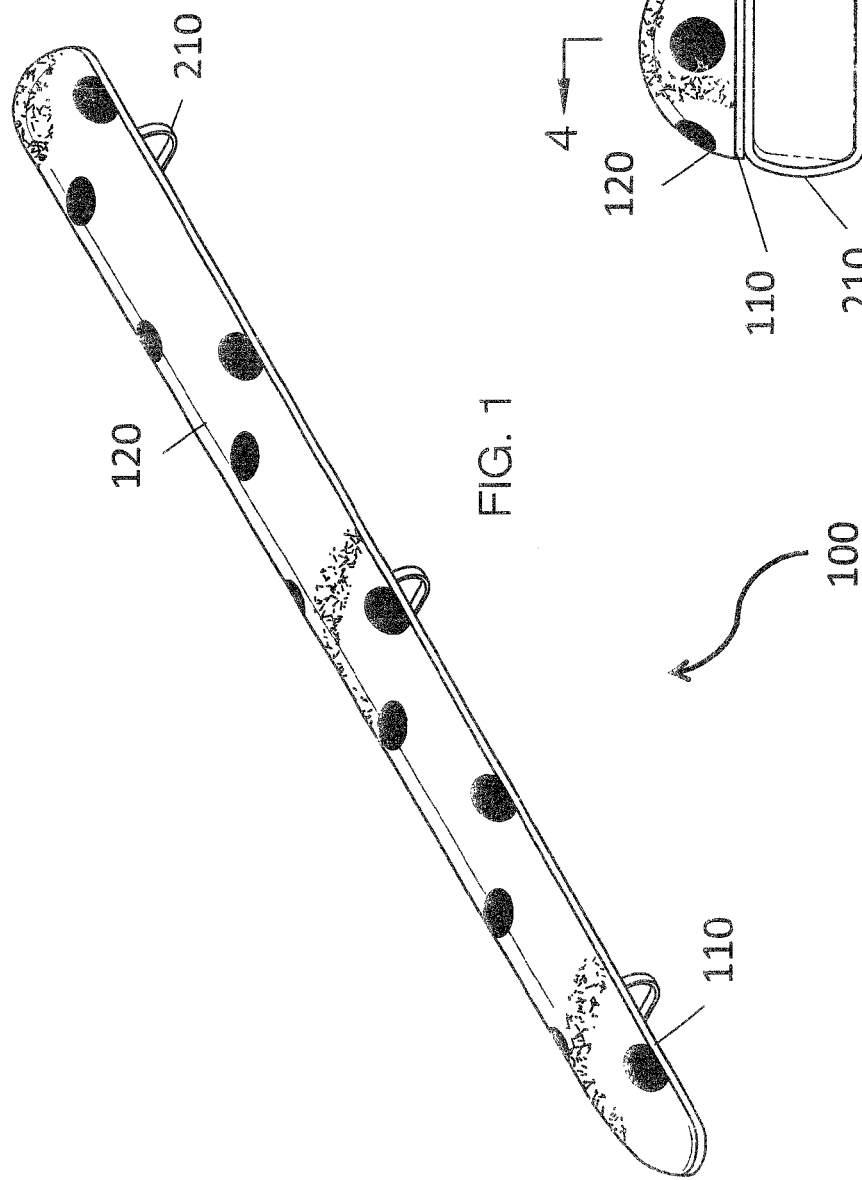
FIG. 1
FIG. 2

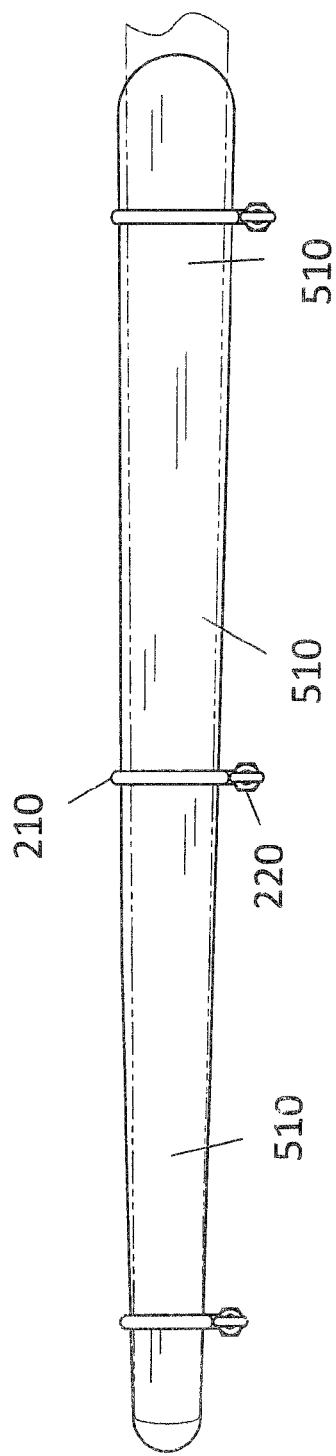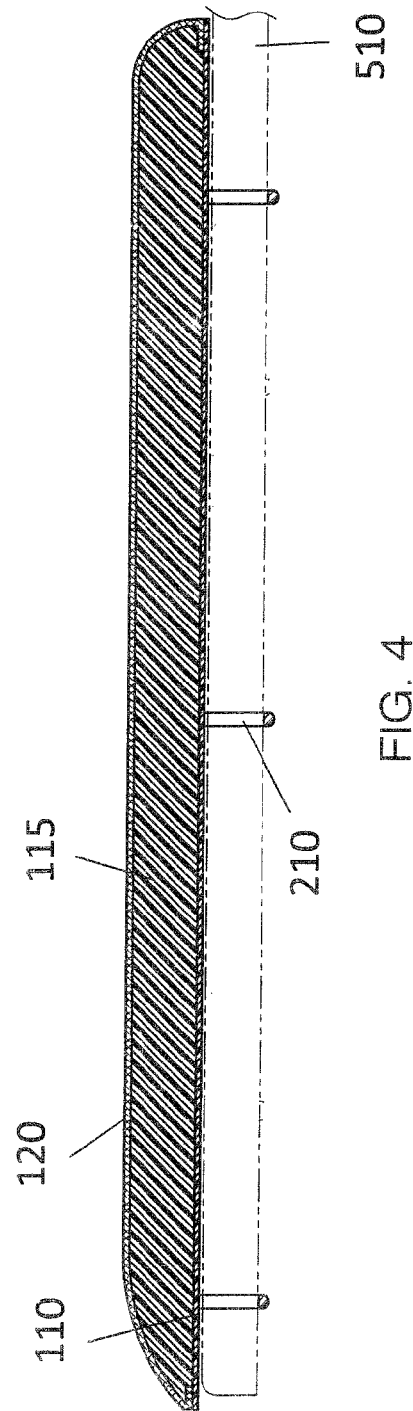

DECORATION DEVICE FOR WINDSHIELD WIPERS

FIELD OF THE INVENTION

The present invention is directed to an accessory for attaching to a windshield wiper, more particularly to a decoration that resembles an animal tail.

BACKGROUND OF THE INVENTION

Windshield wipers are standard features on all vehicles (e.g., front wipers, rear wipers). Windshield wipers generally comprise a wiper blade assembly carried by an arm mounted for movement in reciprocal directions on a windshield of a vehicle. The present invention features a decoration device for windshield wipers. The decoration device can provide entertainment to a user as well as improve the appearance of the wipers.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

The present invention features a decoration device for attaching to a windshield wiper (e.g., an arm of the windshield wiper). The device comprises an elongated strip; a cloth component disposed on a top surface of the strip, the cloth component resembles a tail of an animal; and at least one clip disposed on a bottom surface of the strip, the clip is configured to wrap around a portion of the arm of the windshield wiper, the clip comprises a screw clamp for tightening the clip around the portion of the arm of the windshield wiper.

In some embodiments, the strip is constructed from a generally flexible plastic material. In some embodiments, the animal includes a domestic cat, a domestic dog, a lion, a rhinoceros, a snake, a tiger, an elephant, a zebra, a wolf, a dingo, or a kangaroo. In some embodiments, the cloth component is constructed from a plush material that resembles fur. In some embodiments, the strip is between about 12 to 24 inches in length as measured from a first end to a second end.

The present invention also features a combination windshield wiper with decoration device. The combination windshield wiper with decoration device comprises a standard windshield wiper comprising an arm and a blade; and a decoration device for attaching to the arm of the standard windshield wiper, the decoration device comprising an elongated strip; a cloth component disposed on a top surface of the strip, the cloth component resembles a tail of an animal; and at least one clip disposed on a bottom surface of the strip, the clip is configured to wrap around a portion of the arm of the windshield wiper, the clip comprises a screw clamp for tightening the clip around the portion of the arm of the windshield wiper.

In some embodiments, the strip is constructed from a generally flexible plastic material. In some embodiments, the animal includes a domestic cat, a domestic dog, a lion, a rhinoceros, a snake, a tiger, an elephant, a zebra, a wolf, a dingo, or a kangaroo. In some embodiments, the cloth component is constructed from a plush material that resembles fur. In some embodiments, the strip is between about 12 to 24 inches in length as measured from a first end to a second end.

BRIEF DESCRIPTION OF THE DRAWINGS

FIG. 1 is a top perspective view of a windshield wiper decoration device of the present invention.

FIG. 2 is a back view of the windshield wiper decoration device of FIG. 1.

FIG. 3 is a bottom view of the windshield wiper decoration device of FIG. 1.

FIG. 4 is a side cross sectional view of the windshield wiper decoration device of FIG. 1.

DESCRIPTION OF PREFERRED EMBODIMENTS

Figure 5:
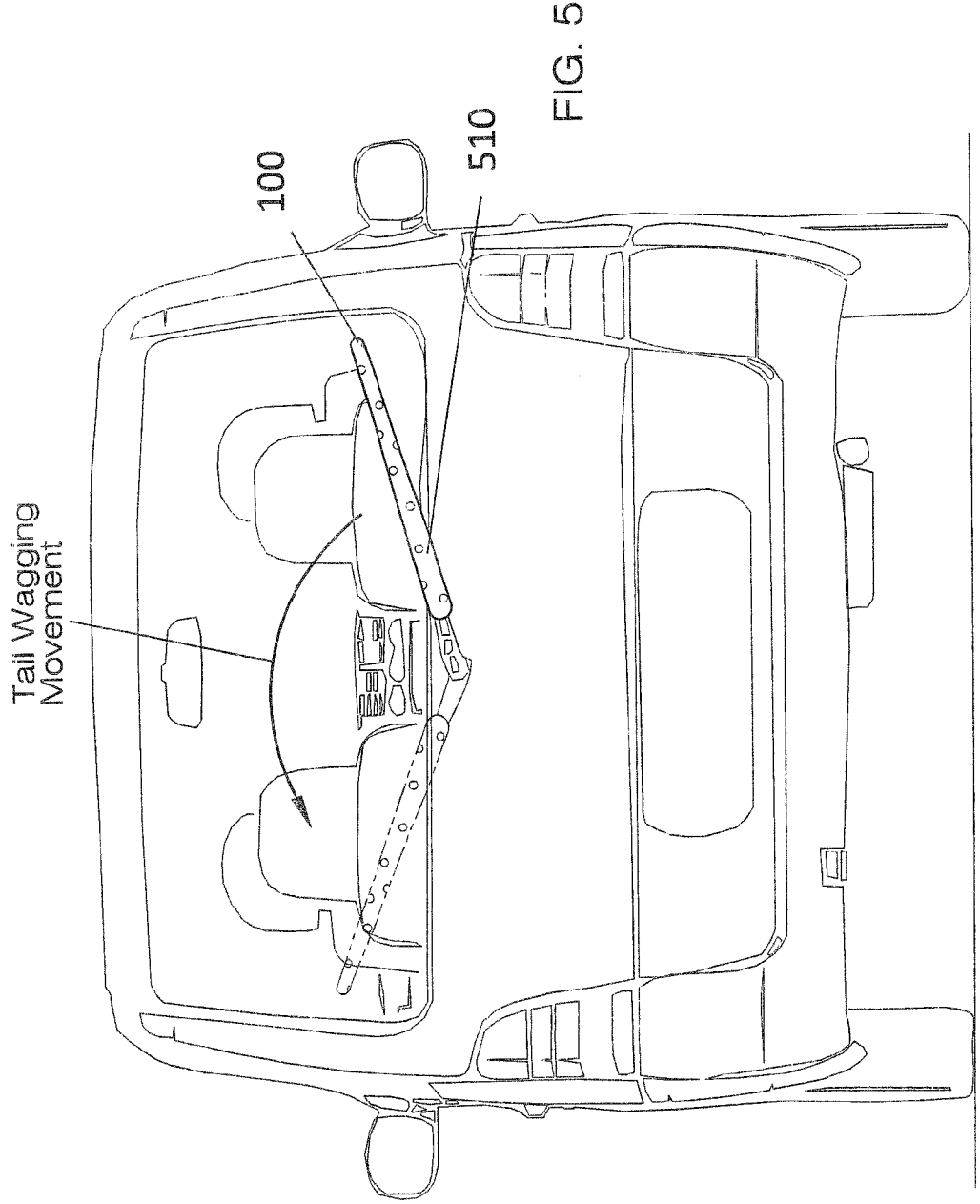
FIG. 5 is an in-use view of the windshield wiper decoration device of FIG. 1.

Referring now to FIGS. 1-5, the present invention features a decoration device 100 for windshield wipers. The decoration device 100 resembles an animal tail, for example a tail of a domestic cat, a domestic dog, a tiger, an elephant, a zebra, a wolf, a dingo, a kangaroo, or the like. The present invention is not limited to the aforementioned examples. The present invention can provide decoration to a vehicle and enhance the appearance of the vehicle.

The decoration device 100 comprises an elongated strip 110 (e.g., plastic strip) having a first end, a second end, a top surface, and a bottom surface. The strip 110 may be generally flexible. Disposed on the top surface of the strip 110 is a cloth component 120. In some embodiments, the cloth component 120 is attached to a core 115, which is attached to the top surface of the strip 110 (see FIG. 4). The cloth component 120 may be constructed from a variety of materials, For example, the cloth component 120 may be furry or be constructed from a plush material that resembles animal fur. The cloth component 120 is constructed in a color and design/patter that resembles a tail of an animal.

The strip 110 may be constructed in a variety of sizes. For example, in some embodiments, the strip 110 is between about 12 to 18 inches in length as measured from the first end to the second end. In some embodiments the strip 110 is between about 18 to 24 inches in length as measured from the first end to the second end. In some embodiments, the strip 110 is more than about 24 inches in length.

The strip 110 with the cloth component 120 can be attached to a windshield wiper 510 (e.g., rear wiper) on a vehicle (e.g., a car, a truck) (see FIG. 5). The windshield wiper 510 can still move (e.g., move left and right) over the windshield or window. The movement of the wiper 510 causes the decoration device 100 to look like a wagging tail.

The decoration device 100 can be attached to the windshield wiper 510 (e.g., rear wiper) via an attachment means. In some embodiments, one or more clips 210 are disposed on the strip 110 (e.g., on the bottom surface of the strip 110). As shown in FIG. 2, FIG. 3, and FIG. 4, the clips 210 can wrap around a portion of the windshield wiper 510 (e.g., the arm), clamping onto the wiper 510 via a tightening mechanism, In some embodiments, the clips 210 are ring-shaped, and can pivot between an open and closed position. The tightening mechanism may be a screw clamp 220. Screw clamps are well known to one of ordinary skill in the art. The present invention is not limited to the aforementioned attachment means or tightening mechanisms. The clip 210 and clamp 220 provide an easy means of attaching the device 100 to any wiper 510, for example wipers of various sizes and models. The attachment means also allows the device 100 to be attached to wipers while using the wipers (e.g., the device 100 does not inhibit the use of the wipers).

In some embodiments, the device 100 of the present invention is constructed in combination with a wiper 510.

As used herein, the term "about" refers to plus or minus 10% of the referenced number. For example, an embodiment wherein the strip 110 is about 20 inches in length includes a strip 110 that is between 18 and 22 inches in length.

The following the disclosures of the following U.S. Patents are incorporated in their entirety by reference herein: U.S. Pat No. 6,327,738; U.S. patent application No. 2005/0235448; U.S. Pat. No. 6,247,201; U.S. Pat. No. 6,070,287.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination windshield wiper with decoration device, said combination windshield wiper with decoration device comprising:
   (a) a standard windshield wiper comprising an arm and a blade; and
   (b) a decoration device for attaching to the arm of the standard windshield wiper, the decoration device comprising:
      (i) an elongated strip;
      (ii) a cloth component disposed on the top surface of the strip, wherein cloth component resembles a tail of an animal; and
      (iii) at least one clip disposed on a bottom surface of the strip, wherein the clip is configured to wrap around a portion of the arm of the windshield wiper, wherein the clip comprises a screw clamp for tightening the clip around the portion of the arm of the windshield wiper;
   wherein the strip is constructed from a generally flexible plastic material; and
   wherein the animal includes a domestic cat, a domestic dog, a lion, a rhinoceros, a snake, a tiger, an elephant, a zebra, a wolf, a dingo, or a kangaroo.

2. The decoration device of claim 1, wherein the cloth component is constructed from a plush material that resembles fur.

3. The decoration device of claim 1, wherein the strip is between about 12 to 24 inches in length as measured from a first end to a second end.

\* \* \* \* \*